United States Patent [19]

Peruchon Edouard et al.

[11] 4,186,494
[45] Feb. 5, 1980

[54] DEVICE FOR ACCURATE MEASUREMENT OF THE SHAPE OF A SUBSTANTIALLY CYLINDRICAL SURFACE

[75] Inventors: Peruchon Edouard; Pierre Rabischong, both of Montpellier, France

[73] Assignee: Societe Nationale Elf Aquitaine (Production), Courbevoie, France

[21] Appl. No.: 883,794

[22] Filed: Mar. 6, 1978

[30] Foreign Application Priority Data

Mar. 10, 1977 [FR] France ................................ 77 07111

[51] Int. Cl.$^2$ .......................... G01B 7/12; G01B 7/28
[52] U.S. Cl. ................................ 33/178 E; 33/178 F; 33/DIG. 13
[58] Field of Search .......... 33/174 L, 174 PA, 178 E, 33/178 F, DIG. 13

[56] References Cited

U.S. PATENT DOCUMENTS

| | | | |
|---|---|---|---|
| 2,495,797 | 1/1950 | Whitlock et al. | 33/178 E |
| 2,708,316 | 5/1955 | Fredd | 33/178 F |
| 2,795,856 | 6/1957 | Reesby et al. | 33/178 F |
| 2,908,085 | 10/1959 | Price et al. | 33/178 F |
| 2,925,660 | 2/1960 | Raulins | 33/178 F |
| 2,927,377 | 3/1960 | McMahan | 33/178 F |
| 3,895,446 | 7/1975 | Orlov et al. | 33/174 PA |
| 3,898,741 | 8/1975 | Casey | 33/178 F |
| 3,939,570 | 2/1976 | Loftus | 33/178 F |
| 4,017,978 | 4/1977 | Peruchon et al. | 33/174 PA |

FOREIGN PATENT DOCUMENTS 7013025  3/1972  Netherlands.

*Primary Examiner*—Richard R. Stearns
*Attorney, Agent, or Firm*—Frishauf, Holtz, Goodman & Woodward

[57] ABSTRACT

Retractable feeler arms are disposed at uniform angular intervals around a central frame and elastically coupled to the frame for radial withdrawal or outward extension and displacement in a general movement of translation of the device. In the operating position, the tips of the feeler arms are maintained in contact with the cylindrical surface to be measured and differential measurements of the end positions of the feeler arms are taken by means of electrical detectors.

10 Claims, 8 Drawing Figures

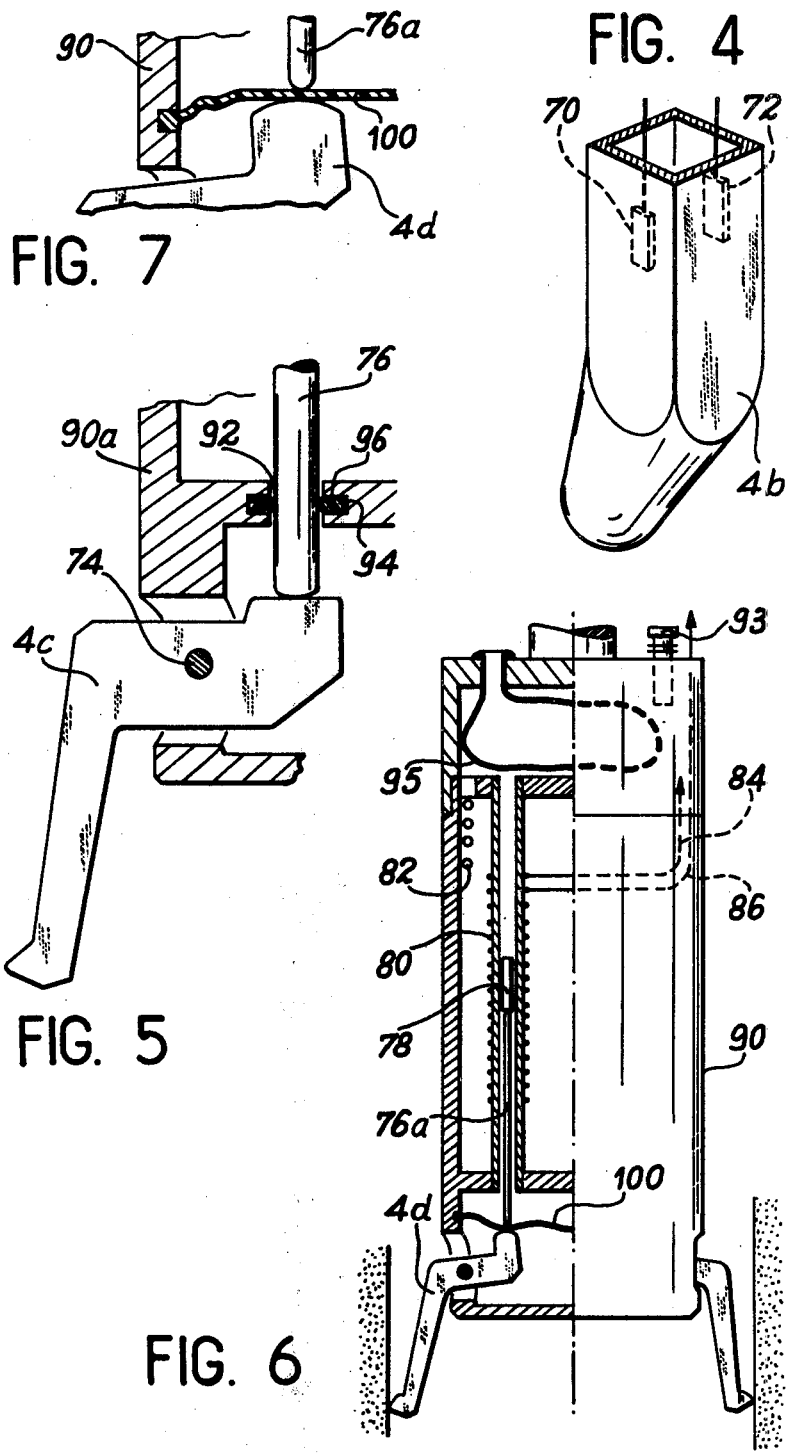

DEVICE FOR ACCURATE MEASUREMENT OF THE SHAPE OF A SUBSTANTIALLY CYLINDRICAL SURFACE

This invention relates to a device for accurate measurement of the shape of a substantially cylindrical surface.

It is known that modern technology calls for the use of large numbers of tubes designed primarily for the circulation of fluids. Notable examples of such tubes are those employed in the heat exchangers of nuclear reactors and pipelines for well-drilling and fluid circulation. In actual practice, it often proves necessary to measure ovalization or corrosion of either the internal or external surfaces of these tubes. Such measurements are often carried out in atmospheres which may be deleterious or difficult to reach, for example at the bottom of an oil-well in the case of tubing strings, or in the circuits surrounding a nuclear reactor. In order to carry out these measurements, provision must accordingly be made for reliable and accurate systems which operate in a simple and straightforward manner.

Impression-taking devices of a mechanical type are usually the most reliable and those which deliver electrical signals are the easiest to interpret. For this reason, the device employed in the invention is of the electro-mechanical type. The contact with the surface of the part is of mechanical nature and the signal which results from this contact is of electrical nature. Furthermore, it is essential to ensure that the mechanical device is relatively versatile or, in other words, permits accurate measurements of variations in diameter and of ovalization of a large number of tubes as well as adaptation to the different diameters of all these tubes. Finally, it appears necessary to convert the mechanical contact information to electrical signals in order that these latter may be recorded and even stored in memory if necessary; devices which are solely of the mechanical type are always complicated to use and cannot readily be controlled.

It is the usual practice in devices of the mechanical type just mentioned to employ an engraving stylus on a substrate for the purpose of marking a curve which corresponds to ovalization of the cylinder or to its surface defects. These devices are complicated by reason of the fact that they entail the need for high-precision mecanical transmission systems and that the mechanical marking operation impairs the sensitivity of the measurement. Moreover, they do not immediately deliver usable information since this latter has to be analyzed after the measurements have been taken.

The device in accordance with the invention makes it possible to remedy the deficiencies of the prior art and to meet the different requirements mentioned in the foregoing.

The measuring device in accordance with the invention serves to determine the precise shape of the substantially cylindrical surface of a tube. Accordingly, said device comprises a plurality of feeler arms coupled elastically to a central frame and disposed at uniform angular intervals around said central frame; means for measuring the end position of each feeler arm as well as means for maintaining said arms in contact with the cylindrical surface to be measured, means for placing said feeler arms in the withdrawn position, as well as means for displacing the unit formed by said central frame and said feeler arms in a movement of translation.

Thus the position of the wall is measured by mechanical means, the information is converted to electrical information and can thus be readily transferred and subjected to digital processing; moreover, the different feeler arms can be withdrawn in order to displace the entire device within a tube without taking any measurement. Placing of the feeler arms in contact with the surface to be measured can be remote-controlled. When the detector is placed in contact with the surface, the connection established between surface and frame is sufficiently resilient to permit the measurement of small variations in shape of the surface of the cylindrical tube. The diametrically opposite arrangement of the feeler arms usually makes it possible to pair the items of information delivered by these latter in order to provide compensation for any possible centering errors by means of a differential measurement.

As will become apparent in the following description, the invention can be carried into effect in two main alternative forms: when the variations in diameter of the cylindrical tube to be measured are small, it is possible to make use of strain gages in order to measure said variations which in turn result in varying degrees of bending or flexural deformation of the feeler arm; in the case of greater variations in nominal diameter of a cylindrical tube, preference is given to the use of an impression-taking device in which each feeler arm is provided with a mechanical transmission system for producing action on a rod having a magnetic portion slidably mounted within a secondary winding of a transformer which is surrounded by a primary winding. Positional variation of the magnetic portion of the rod has the effect of modifying the flux through the secondary winding which is mounted as a differential transformer and consequently modifying the voltage developed across the terminals of the winding.

Further distinctive features and advantages of the invention will be brought out by the following description of embodiments given by way of explanatory example but not in any limiting sense, reference being made to the accompanying drawings, in which:

FIG. 4 shows one example of the feeler arm fitted with strain gages employed for measuring small variations in diameter by taking a measurement of flexural deformations of the rod which supports the feeler arms;

FIG. 5 shows a mechanical transmission system comprising rods which pass through a seal of the O-ring type;

FIG. 6 is a general view of the device of which one detail is illustrated in FIG. 5, the contact between feeler arm and tube being established by means of a diaphragm;

FIG. 7 is a detail view showing the application of the feeler arm and the rod of the secondary winding on the diaphragm;

Figure 1:
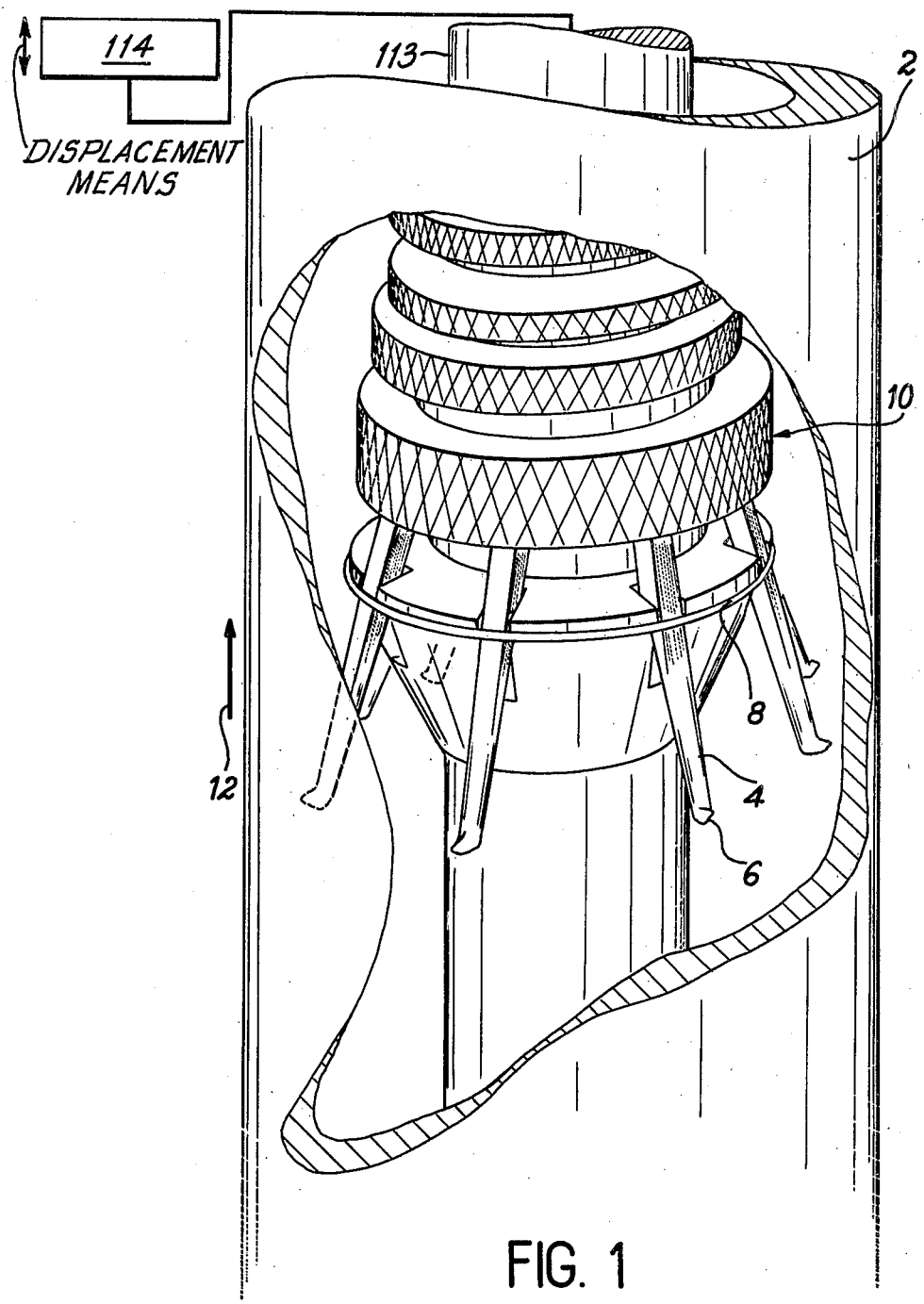
FIG. 1 is a part-sectional view of a detector in accordance with the invention and placed within a cylindrical tube in the position of measurement.

In FIG. 1, there is shown a device in accordance with the invention for measuring the internal diameters of a substantially cylindrical tube along eight generating lines; the device comprises eight feeler arms disposed at angular intervals of 45°. The cylinder 2 is cut away in order to show the feeler arms such as the arm 4, the tip 6 of which is in contact with the internal wall of the cylindrical tube 2. The feeler arms which are designated by the reference 4 are mounted on a pivot-pin (not shown) and maintained in position by means of a ring 8. The complete assembly of components, knurled rings and counter-nuts shown in FIG. 3 serves either to withdraw the feeler arms or to place them in the measurement position. At the time of measurement, the feeler arms move together as a single unit in the direction of the arrow 12.

If so desired, it is also possible to employ means 114 for driving the device by its central support 113 in translational motion along the axis of the tube and in rotational motion for a fraction of a revolution in order to scan a greater number of generating lines of the cylinder.

Figure 2:
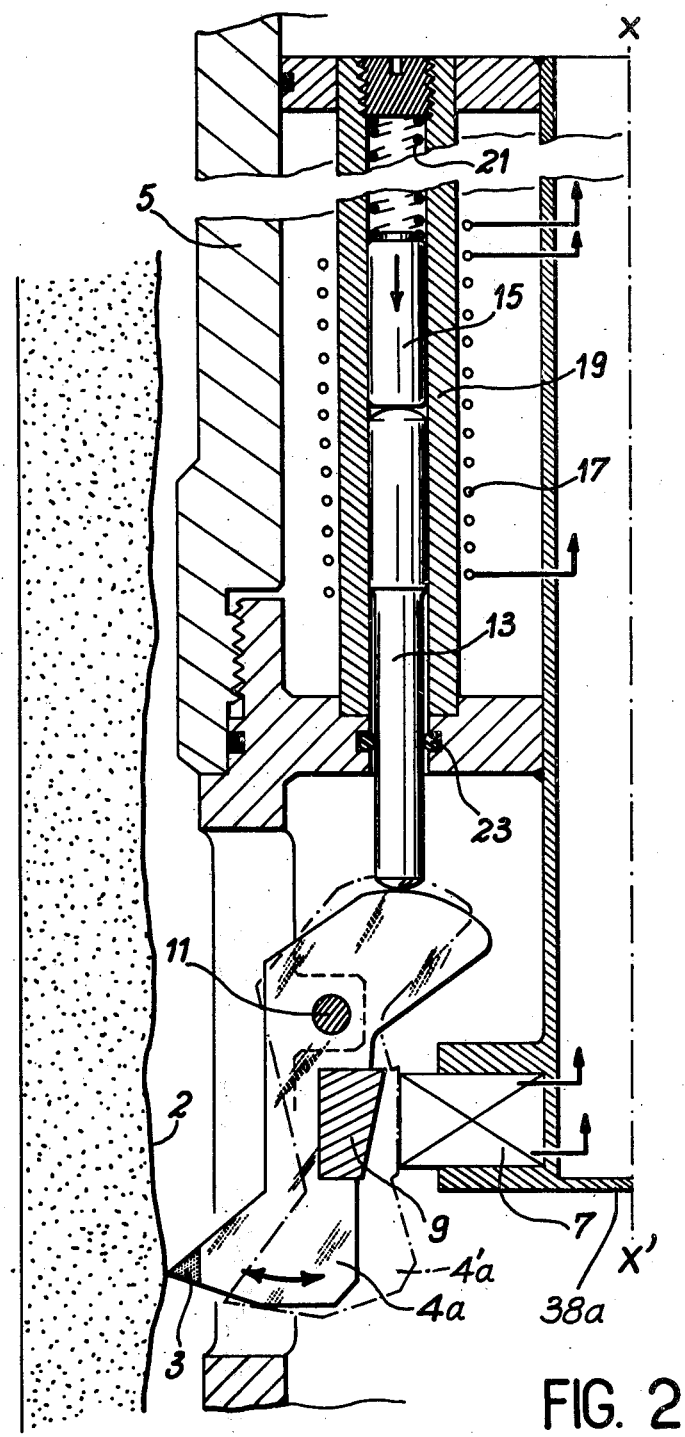
FIG. 2 is a diagrammatic sectional view of one embodiment of the invention.

FIG. 2 is a diagrammatic presentation of an embodiment of the invention differing somewhat from FIG. 1. The device shown in cross-section in FIG. 2 comprises N feeler arms such as the arm 4 which are placed in diametrically opposite positions with respect to an axis x-x'. The surface 2 is scanned along a generating line by the tip 3 of the feeler arm 4a. The tip of said arm is inserted in a slot of the cylinder 5. The feeler arm 4a is placed in the withdrawn position 4a by means of the electromagnet 7 (mounted on the central tubular frame 38a) which produces action on the magnetic armature 9 which forms part of the feeler body. The feeler arm is capable of carrying out a pivotal movement about the pin 11. During operation, that is during the measurement operation, the electromagnet is not energized and the projecting feeler arm 4a is in contact with the surface 2. At the time of positioning of the feeler arm by downward displacement within the tube for example, said arm is withdrawn. As shown in FIG. 2 described hereinafter, the feeler arm is coupled to a rod 13 comprising an element 15 of magnetic material for varying the inductance of a winding 17. A restoring spring 21 fitted within the cylinder 19 has the effect of urging a feeler arm such as the arm 4a towards the exterior of the cylinder 5 when the electromagnet is no longer energized; the sealed portion of the device, or in other words the electrical measuring portion, is made fluid-tight by means of the O-ring seal 23.

Figure 3:
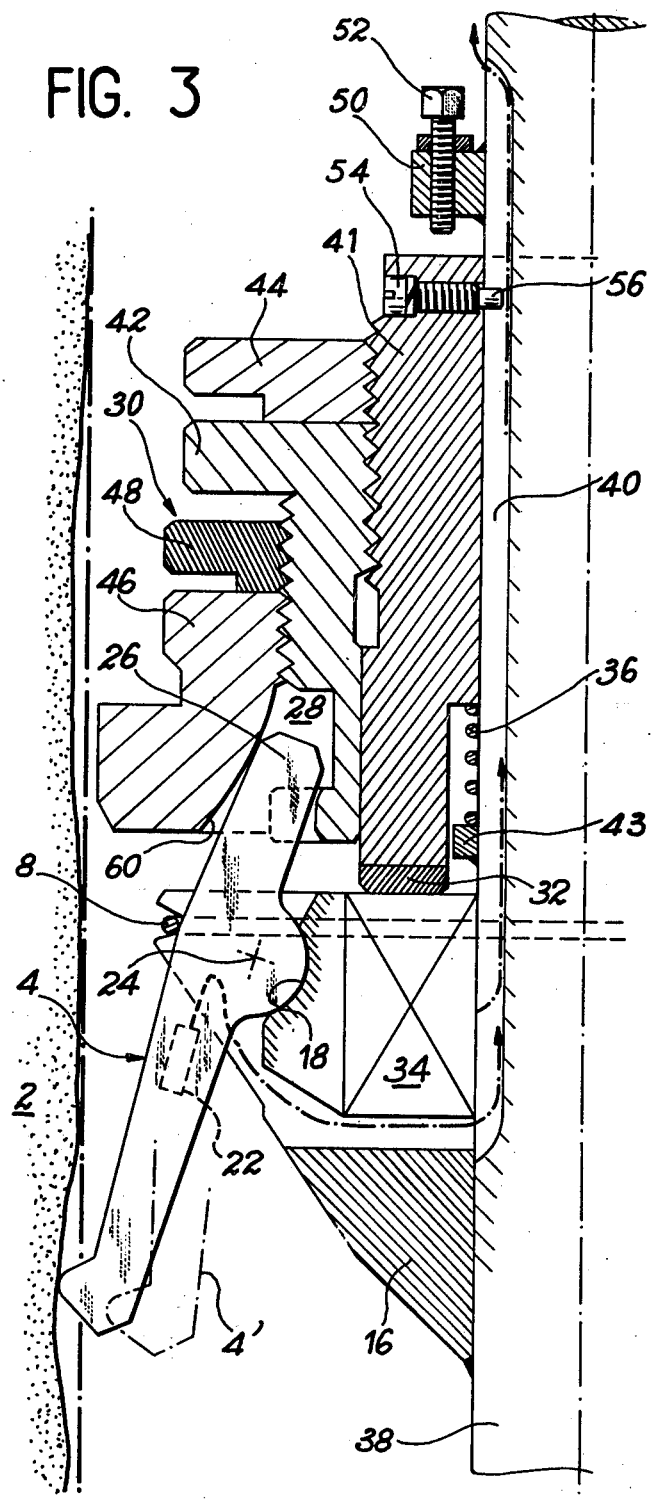
FIG. 3 is a radial sectional view of the device shown in FIG. 1 and illustrates in detail the means employed for tightening and locking the feeler arm in position.

FIG. 3 illustrates in detail the means adopted for mounting a feeler arm on the central frame 38 in the embodiment of the invention shown in FIG. 1. The feeler arm 4 is shown in full lines in the measurement position since it is in contact with the wall of the cylinder 2. This wall can be either an inner wall or an outer wall. This figure also shows the feeler arm in the withdrawn position 4' which is employed when it is desired to move the device at high speed in order to place this latter in a position defined prior to commencement of the measuring operation. The feeler arm 4 rests on a support unit 16 having a concave cylindrical recess 18. In addition, the unit 30 is maintained in a withdrawn position by means of a spring 36, one end of which is attached to the support frame 38, whilst the units 16 and 38 are in rigidly fixed relation. The support frame 38 is recessed so as to form a channel or groove 40 in order to provide a passageway for the different electric leads such as, for example, the leads 43 for transmitting electrical information obtained on strain gages such as the gage 22 and for controlling the electromagnet 34. The unit 30 comprises a first cylindrical sleeve 41 provided with an external thread, a knurled ring 42 which is screwed onto said threaded portion and which can be locked in position by means of a counternut 44. The knurled ring 42 defines the lower portion of the recess 28 in which the rear portion 26 of the feeler arm 4 is inserted and rests. An outer ring 46 is engaged on the knurled ring 42 which also has an external threaded portion at the upper end, said outer ring 46 being locked in position by means of a counter-nut 48 which delimits the top portion of the recess 28. This portion of the support unit 16 is intended to accommodate the corresponding convex cylindrical portion of the feeler arm 4 in order to permit free pivotal motion of this latter on the above-mentioned bearing recess 18. The feeler arm is retained by means of a ring 8 located approximately at the center of curvature of the bearing recess 18 of said support unit. Thus the feeler arm pivots about a geometrical axis 24 which passes through the plane of FIG. 3 at the point marked by a cross.

In this alternative embodiment of the invention, the feeler arm is fitted with strain gages such as the gage 22 for measuring the flexural deformation of the arm as a function of variations in the surface of the cylinder 2. The rear portion 26 of the feeler arm 4 engages within the recess 28 of a unit 30 for placing in position and withdrawing said feeler arm. Positioning of said unit 30 is carried out as a result of interaction of a magnet 32 which forms part of said unit and of an electromagnet 34 which is remote-controlled by electrical means (not shown).

The stop 50 which can be adjusted by means of the screw 52 serves to limit the displacement of the cylindrical sleeve 41. The unit 30 can be locked in the forward position by means of the set-screw 54 which penetrates into a hole 56 of the central cylindrical frame 38.

The operation of the system is as follows: the feeler arm 4 can be changed-over from the measurement position to the withdrawn position by passing a current into the electromagnet 34; this latter attracts the oppositely-facing magnet 32 in order to compress the spring 36. In consequence, the curved portion 60 of the outer ring 46 bears on the rear portion 26 of the arm 4 in order to put the tip of said arm in contact with the surface 2 of the cylindrical tube. Whenever it is desired to place a device in the withdrawn position, the current within the electromagnet is interrupted; this permits expansion of the spring 36, whereupon the unit 30 is thrust towards the right in FIG. 3 and abuttingly applied against the screw 52 of the stop 50; the upper surface of the rear portion 26 of the feeler arm is then released and the arm takes up the position 4' in a movement of rotation about the axis 24.

Depending on the diameter of the tube employed, it is possible to adjust the position of the feeler so as to put this latter in contact with the surface of the cylinder. To this end, the set-screw 54 is removed and the cylindrical sleeve 41 is displaced downwards, thus moving the knurled ring 42 to the suitable position of the bottom portion of the recess 28. By rotating the knurled ring, the outer ring 46 can also be placed in the right position for establishing the position of the top portion of the recess 28. The outer ring 46 is locked in position by means of the counter-nut 48.

In FIG. 4 there is shown a feeler arm 4b in accordance with an embodiment of the invention in the event of small variations in nominal diameter of the cylindrical tube 2. It is possible in this case to observe these variations by means of the strain gages 70 and 72 which serve to measure the flexural deformation of the feeler arm. The strain gage 70 works in compression and the gage 72 works in flexion. These gages are usually placed in the opposite arms of a measuring bridge (not shown). In this embodiment, the strain gages can be placed inside the tube and are consequently not in contact wth the medium which surrounds the measuring device. This represents a very considerable advantage by reason of the aggressive environment which is sometimes encountered.

Since the system is intended to operate at very high pressures, it is an advantage to achieve pressure equilibrium by filling the interior of the tube with oil. It is also possible to make use of a telescopic tube filled with oil.

In FIG. 5, there is shown another embodiment of the detector in which the feeler arm 4c pivots about a pin 74 and not on a bearing surface such as the recess 18 shown in FIG. 3. In this alternative embodiment, the arm 4 produces action on a rod 76 which has a ferro-magnetic portion. As can be observed in FIG. 6, a rod 76a of this type comprises a ferro-magnetic portion 78 slidably mounted within a winding 80 which constitutes the secondary of a transformer. The primary circuit 82 of the transformer is supplied with alternating current through leads which are not shown in the figure. The association of the rod 76a and of the windings 80 serves to measure the displacements of the feeler arm 4d. It is in fact apparent from FIGS. 5, 6 and 7 that, when the feeler arm 4c or 4d moves, the rod 76 or 76a, as the case may be also moves together with the magnetic armature 78 inside the winding 80. By means of two windings of opposite direction, the winding 80 makes it possible to constitute a small differential transformer supplied from the primary circuit of FIG. 6. The movement of the ferro-magnetic portion 78 produces an unbalance in the flux passed into the two portions of the winding 80 which are mounted in opposition. The electrical information obtained from each rod is transmitted by leads such as those designated by the references 84, 86 and so forth to a measuring instrument and if necessary to a multiplexer. The N voltages developed across the terminals of N secondary windings are delivered sequentially by said multiplexer to a visual display medium on which the impression of the cylinder surface is reconstituted from said N voltages by means of N points. The coordinate of each point on the visual display medium (such as a television screen, for example) is a linear function of the voltage developed on the terminal of the corresponding secondary winding In order to ensure fluid-tightness of the measuring assembly which comprises rods slidably mounted within differential windings, an alternative embodiment of the invention (FIG. 5) consists in providing the casing 90a which surrounds the windings with openings 92 in which said rods 76 are capable of sliding; said openings 92 are completed by grooves 94 so arranged as to permit insertion of an O-ring seal 96 within which the rods 76 are slidably fitted. In the device shown in FIG. 6, contact between the feeler arm 4d and the rod 76a is established by means of a flexible diaphragm 100 in order to achieve perfect fluid-tightness of the casing 90. Thus said casing can be filled with oil and overpressurized by means of an internally-threaded screw 93, for example. As shown in FIG. 6, a bladder 95 can also be fitted at the top end of the casing 90 and is intended to be filled with the liquid which surrounds said casing.

In FIG. 7, there is shown an enlarged view of the contact established between the rod 76a and the feeler arm 4a by means of the diaphragm 100 which is secured to the casing 90 in leak-tight manner.

Figure 8:
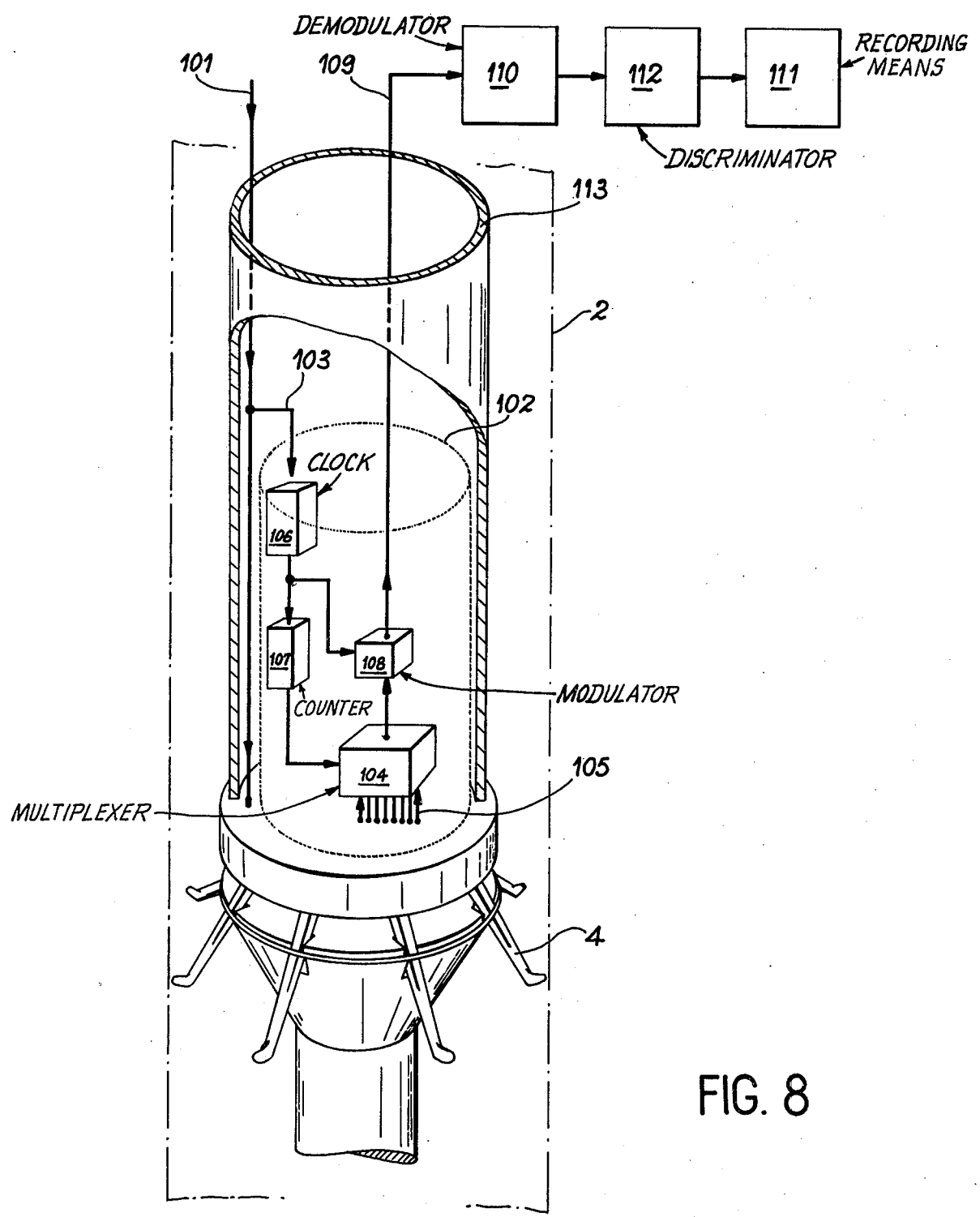
FIG. 8 shows the means employed for the transmission of signals between the feeler arms and the exterior of the tube.

Referring now to FIG. 8, it is apparent that this figure is a diagrammatic presentation of the means for transmitting signals from the unit comprising the feeler arms 4 (for example, in the device of FIGS. 1 and 3) to the exterior of the tube 2. At least one transmission line 101 serves to carry the different signals for control and supply of the means for retracting the feeler arms and of the means for carrying out differential measurements. Modulating and multiplexing means contained within a casing 102 which may be fluid-tight if necessary can also be supplied at 103 by the transmission line 101 aforesaid. It is readily apparent that said modulating and multiplexing means could be housed within the assembly which includes the feeler arms 4. The modulating and multiplexing means contained within the casing 102 comprise a multiplexer 104, the signals from the different detectors which are connected to the feeler arms 4 being applied to the multiplexer at 105. Said multiplexer is connected to a clock 106 through a counter 107. In the example of construction herein described, the multiplexer 104 has eight inputs 105 corresponding respectively to each of the eight feeler arms 4. The counter 107 is consequently an eight-position counter in order to permit multiplexing of the signals delivered by the detectors.

The multiplexed signals are modulated in frequency, in amplitude or in phase by the modulator 108 which is controlled by the clock 106. These modulated and multiplexed signals are then transmitted via a transmission line 109 to a demodulator 110 connected to recording means 111 through a discriminator 112 which operates as an amplitude, frequency or voltage discriminator depending on the type of modulation effected at the outset. The recording means 111 can be constituted for example by a memory or storage device which permits subsequent processing of signals. These means can also be constituted by a curve tracer, by a CRT display system permitting instantaneous visualization of the internal shape of the tube, or by a sound indicator which emits a sound signal when a deformation threshold is overstepped. The number of leads employed for transmission of the measurement signals is limited by means of a "built-in" multiplexer and modulator located next to the feeler arms. By virtue of the visual display system, it is possible to stop the device, to carry out a backward return movement and finer scanning when a doubtful zone has been located. This represents a considerable advantage over existing devices which permit only delayed analysis of information obtained from the detectors.

It has been assumed in the illustrative embodiment described in the foregoing that the multiplexing and modulating means are located within the shaft 113 which supports the feeler arms and that said shaft is of hollow construction.

What we claim is:

1. A device for measuring the precise shape of a substantially cylindrical surface comprising a plurality of feeler arms connected to a central frame and disposed at uniform angular intervals around said frame and electrical detectors for measuring the position of the free end of each feeler arm as well as means for maintaining each arm in contact with the cylindrical surface to be measured, means of electromagnetic type for placing said feeler arms in a withdrawn position and means for displacing all the feeler arms together in a common movement relative to said surface, wherein the detectors for measuring the position of each feeler arm end are electrical means for taking differential measurements of the positions of said feeler arm ends, these electrical means being connected to means for multiplexing and modulating signals delivered by the electrical means for taking differential measurements, said mutiplexing and modulating means being coupled with means for demodulating the modulated signals which are connected to recording means through a discriminator.

2. A device according to claim 1, wherein the recording means aforesaid are constituted by a cathode-ray tube visual display system.

3. A device according to claim 1, wherein at least one transmission line is provided for controlling the withdrawal of the feeler arms and to supply the differential measurement means with power and wherein at least one additional transmission line is provided between the modulating and demodulating means.

4. A device according to claim 3, wherein the means for taking differential measurements are strain gages connected to the feeler arms.

5. A device according to claim 3, wherein the multiplexing and modulating means are located within a fluid-tight casing.

6. A device according to claim 1, wherein the multiplexing and modulating means are located in close proximity to the feeler arms in order to be contained within the tube whose shape is to be measured, the demodulating and recording means being located outside the tube.

7. A device according to claim 6, wherein the modulating means are controlled by a clock which controls the multiplexing means by means of a counter.

8. A device for measuring the precise shape of a substantially cylindrical surface comprising a plurality of feeler arms, each connected by a pivot to a central frame and all disposed at uniform angular intervals around said frame and electrical detectors for measuring the position of the free end of each feeler arm as well as means for maintaining each arm in contact with the cylindrical surface to be measured, wherein said detectors are secured to the frame, wherein electrical means are provided for multiplexing signals delivered by said detectors, wherein also the extremity of each feeler arm which is opposite to the tip which is in contact with the cylindrical surface is arranged so as to actuate a rod provided with a ferro-magnetic portion and slidably mounted within a winding constituting one of N secondary windings of a transformer for providing at the terminals of said secondary windings, N voltages developed thereacross, the common primary circuit of said transformer being formed by a single winding which surrounds the N secondary windings, said primary circuit being supplied with alternating current from a source of alternating current of constant amplitude, the association of a rod and a winding being such as to constitute a detector, said multiplexing means being provided with means for sequentially transmitting the N voltages developed across the terminals of the N secondary windings in modulated form to means for reconstituting the impression of the said surface from said N voltages by means of N points, having recording means provided with a visual display device, one coordinate of each point on said visual display device being a linear function of the voltage developed on the terminal of the corresponding secondary winding.

9. A device according to claim 8, wherein each said contact between a feeler-arm extremity and said rod provided with a ferro-magnetic portion is established by means of an intermediate deformable diaphragm and wherein a casing (90) is provided for the assembly constituted by the primary winding and the N secondary windings which is fluid-tight and provided with means (93) for increasing the pressure maintained therein.

10. A device according to claim 9, wherein said casing is filled with oil.

* * * * *